United States Patent
Boggs et al.

(10) Patent No.: US 6,688,411 B2
(45) Date of Patent: Feb. 10, 2004

(54) HYBRID ELECTRIC VEHICLE AND A METHOD FOR OPERATING A HYBRID ELECTRIC VEHICLE

(75) Inventors: David Lee Boggs, Bloomfield Hills, MI (US); Jerry D. Robichaux, Tucson, MI (US); Mark William Peters, Wolverine Lake, MI (US); Paul Michael Deniston, Westland, MI (US); Stephen John Kotre, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 09/683,026

(22) Filed: Nov. 9, 2001

(65) Prior Publication Data

US 2003/0089538 A1 May 15, 2003

(51) Int. Cl.$^7$ .................................................. B60K 6/02
(52) U.S. Cl. ..................... 180/65.2; 180/65.1; 123/352; 123/357; 701/110
(58) Field of Search ............................... 180/65.1, 65.2; 123/350, 352, 357; 701/110

(56) References Cited

U.S. PATENT DOCUMENTS

| | | | |
|---|---|---|---|
| 4,335,429 A | * | 6/1982 | Kawakatsu ................. 701/102 |
| 5,540,202 A | * | 7/1996 | Cullen et al. .......... 123/406.47 |
| 5,626,117 A | | 5/1997 | Wright |
| 6,006,725 A | | 12/1999 | Stefanopoulou et al. |
| RE36,737 E | * | 6/2000 | Brehob et al. ............... 123/299 |
| 6,085,729 A | | 7/2000 | Kondo et al. |
| 6,186,124 B1 | * | 2/2001 | Stefanopoulou et al. ..... 123/492 |
| 6,247,437 B1 | * | 6/2001 | Yamaguchi et al. ...... 123/179.3 |
| 6,266,956 B1 | * | 7/2001 | Suzuki et al. .................. 60/278 |
| 6,352,489 B1 | * | 3/2002 | Kuroda et al. .................. 477/5 |
| 6,449,944 B1 | * | 9/2002 | Yasui et al. .................... 60/277 |

* cited by examiner

Primary Examiner—Brian L. Johnson
Assistant Examiner—Brian L Swenson
(74) Attorney, Agent, or Firm—Carlos Hanze; Brooks Kushman P.C.

(57) ABSTRACT

A hybrid electric vehicle 10 and a method for operating the hybrid electric vehicle 10 in which combustion is made to occur within the internal combustion engine 24 only after the crankshaft 25 of the engine 24 has been rotated by an electric motor or generator 30 to a certain speed and according to a certain ramped or partially ramped profile 114, 112, thereby reducing the amount of emissions from the engine 24, allowing for a more efficient torque transfer to wheels 42, and allowing for a more smoother operation of the vehicle 10. The fuel injectors 13, throttle plate 11, and spark plugs 15 are also controlled in order to allow emissions to be reduced during activation of the engine and to allow the catalytic converter 7 to be heated in order to allow these emissions to be further reduced as the engine 24 is operating.

8 Claims, 5 Drawing Sheets

HYBRID ELECTRIC VEHICLE AND A METHOD FOR OPERATING A HYBRID ELECTRIC VEHICLE

BACKGROUND OF INVENTION (1) Field of the Invention

The present invention relates generally to a hybrid electric vehicle (HEV), and more specifically to a hybrid electric vehicle which includes and which selectively activates or "starts" an internal combustion engine in a certain predetermined manner, effective to allow the generated torque to be efficiently communicated to the wheels of the HEV while allowing for a smooth overall operation of the vehicle and concomitantly reducing the amount of hydrocarbon exhaust emissions produced by the vehicle.

(2) Background of the Invention

The need to reduce fossil fuel consumption and emissions in automobiles and other vehicles predominately powered by Internal Combustion Engines (ICEs) is well known. Vehicles powered by electric motors attempt to address these needs. Another alternative solution is to combine a smaller ICE with electric motors into one vehicle. Such vehicles combine the advantages of an ICE type vehicle and an electric vehicle and are typically called Hybrid Electric Vehicles (HEVs). See generally, U.S. Pat. No. 5,343,970 (Severinsky).

The HEV is manifested in a variety of configurations. Many HEV patents disclose systems where an operator is required to select between electric and internal combustion operation. In other configurations, the electric motor drives one set of wheels and the ICE drives a different set.

Other, more useful, configurations have developed. For example, a Series Hybrid Electric Vehicle (SHEV) configuration is a vehicle with an engine (most typically an ICE) connected to an electric motor called a generator. The generator, in turn, provides electricity to a battery and to another motor, called a traction motor. In the SHEV, the traction motor is the sole source of wheel torque. There is no mechanical connection between the engine and the drive wheels. A Parallel Hybrid Electrical Vehicle (PHEV) configuration has an engine (most typically an ICE) and an electric motor that work together in varying degrees to provide the necessary wheel torque to drive the vehicle. Additionally, in the PHEV configuration, the motor can be used as a generator to charge the battery from the power produced by the ICE.

A Parallel/Series Hybrid Electric Vehicle (PSHEV) has characteristics of both PHEV and SHEV configurations and is sometimes referred to as a "powersplit" configuration. In one of several types of PSHEV configurations, the ICE is mechanically coupled to two electric motors in a planetary gear-set transaxle. A first electric motor, the generator, is connected to a sun gear. The ICE is connected to a carrier. A second electric motor, a traction motor, is connected to a ring (output) gear via additional gearing in a transaxle. Torque from the ICE can power the generator to charge the battery. The generator can also contribute to the necessary wheel (output shaft) torque if the system has a one-way clutch. The traction motor is used to contribute wheel torque and to recover braking energy to charge the battery. In this configuration, the generator can selectively provide a continuous variable transmission (CVT) effect. Further, the HEV presents an opportunity to better control engine idle speed over conventional vehicles by using the generator to control engine speed.

The desirability of combining an ICE with electric motors is clear. There is great potential for reducing vehicle fuel consumption and emissions with no appreciable loss of vehicle performance or drive-ability. The HEV allows the use of smaller engines, regenerative braking, electric boost, and even operating the vehicle with the engine shutdown.

SUMMARY OF INVENTION

It is a first non-limiting advantage of the present invention to provide a hybrid electric vehicle (HEV) having some or all of the improvements which are delineated above. It is a second non-limiting advantage of the present invention to provide a method for operating a HEV which allows for some or all of the previously delineated improvements to be achieved.

It is a second non-limiting advantage of the present invention to provide a method for operating a HEV which allows for some or all of the previously delineated improvements to be achieved.

According to a first aspect of the present invention, a hybrid electric vehicle is provided having an internal combustion engine which produces hydrocarbon exhaust emissions and which is activated only after a portion of the internal combustion engine is rotated to a certain speed, thereby reducing the amount of the hydrocarbon emissions produced by the internal combustion engine.

According to a second aspect of the present invention, a method for operating a hybrid electric vehicle of the type having a selectively activated internal combustion engine is provided. The method includes the steps of rotating the internal combustion engine to a certain speed; and causing combustion to occur within the internal combustion engine only after the certain speed has been attained.

These and other features, aspects, and advantages of the present invention will become more apparent to persons having ordinary skill in the art to which the present invention pertains from the following description taken in conjunction with the accompanying drawings.

DETAILED DESCRIPTION

Figure 1:
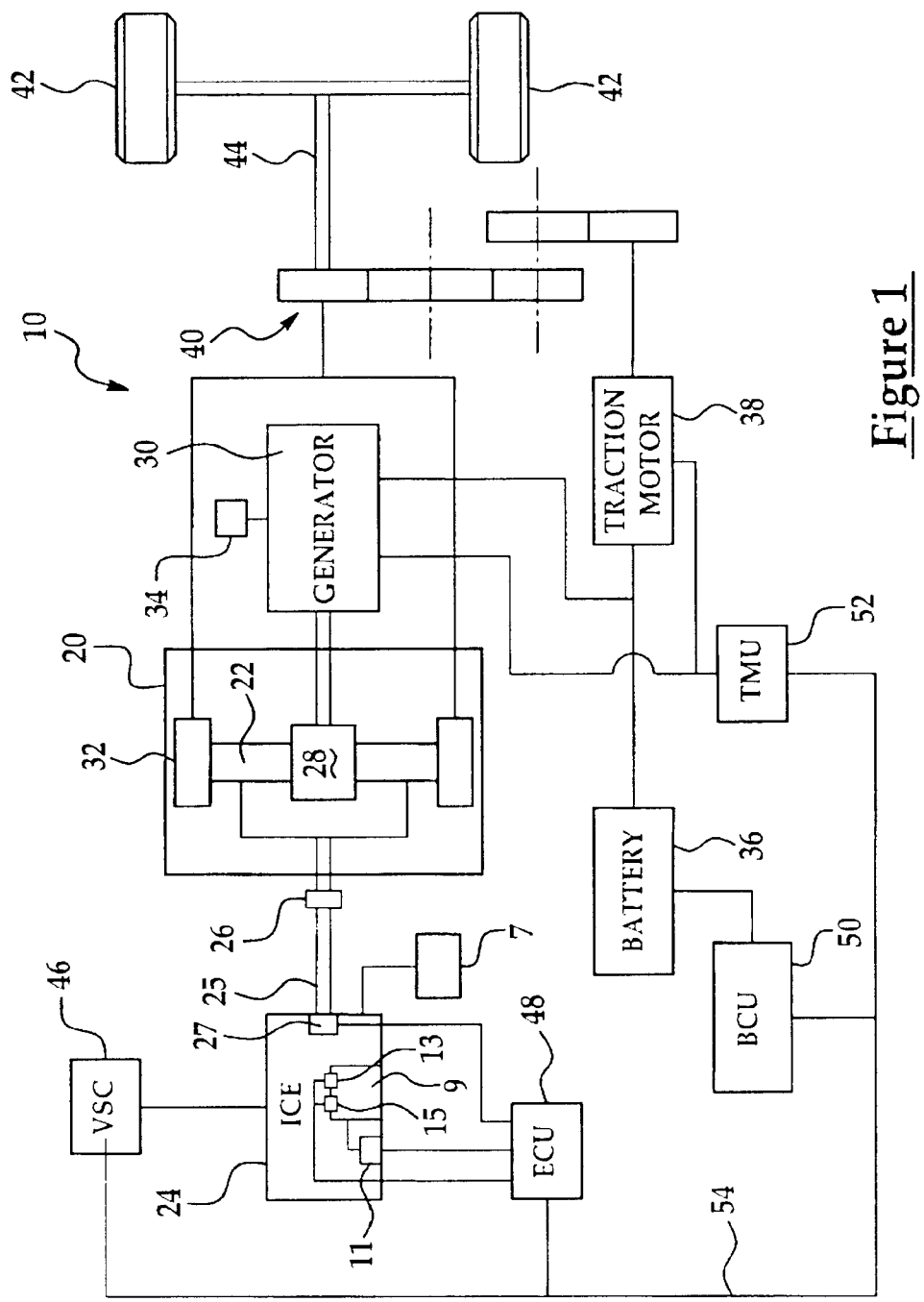
FIG. 1 illustrates a general powersplit hybrid electric vehicle (PSHEV) configuration.

The present invention relates to electric vehicles and, more particularly, hybrid electric vehicles (HEVs). FIG. 1 demonstrates just one possible configuration, specifically a parallel/series hybrid electric vehicle (powersplit) configuration 10.

In a basic HEV 10, a planetary gear set 20 mechanically couples a carrier gear 22 to the crankshaft 25 of an internal combustion engine 24 via a one way clutch 26. The planetary gear set 20 also mechanically couples a sun gear 28 to a generator motor 30 and a ring (output) gear 32. The internal combustion engine 24 is of the type having at least one piston containing cylinder 9 into which a mixture of fuel and air is communicated and selectively combusted, thereby moving the piston (not shown) and causing the crankshaft 25 to rotate, effective to allow torque to be produced. More particularly, the engine 24 further includes a selectively positionable throttle plate 11 which allows air to enter the at least one cylinder 9, a fuel injector 13 which selectively places fuel into the at least one cylinder 9, and a spark plug 15 which selectively provides electrical energy into the at least one cylinder 9, effective to cause the mixture of fuel and air residing within the at least one cylinder 9 to be combusted. As should be appreciated, each of the various cylinders 9 of the engine 24 respectively include one such spark plug 15 and a fuel injector 13 and the various spark plugs 15 may be effectively energized according to a desired pattern or order. The fuel may be delivered from the various fuel injectors 13 according to a desired pattern or order. The engine 24 is typically coupled to a catalytic converter 7 which receives and processes the emissions emanating from the engine 24.

The generator motor 30 mechanically links to a generator brake 34 and is electrically linked to a battery 36. A traction motor 38 is mechanically coupled to the ring gear 32 of the planetary gear set 20 via a second gear set 40, is electrically linked to the battery 36, and is coupled to the generator 30. The ring gear 32 of the planetary gear set 20 and the traction motor 38 are mechanically coupled to drive wheels 42 via an output shaft 44 and the gear set 40.

The planetary gear set 20 splits the output energy of engine 24 into a series path from the engine 24 to the generator motor 30 and a parallel path from the engine 24 to the drive wheels 42. The speed of engine 24 can be controlled by varying the split to the series path while maintaining the mechanical connection through the parallel path. The traction motor 38 augments the power of engine 24 to the drive wheels 42 on the parallel path through the second gear set 40. The traction motor 38 also provides the opportunity to use energy directly from the series path, essentially running off power created by the generator motor 30. This reduces losses associated with converting the chemical energy in the battery 36 into electrical energy and allowing all energy produced by engine 24, minus conversion losses, to reach the drive wheels 42.

A vehicle system controller (VSC) 46 controls many components in this HEV configuration by connecting to various controllers which operate some or all of the foregoing elements. The engine control unit (ECU) 48 connects to the engine 24 (such as to the spark plugs 15, throttle plate 11, and fuel injectors 13), via a hardwire interface. The ECU 48 and VSC 46 may be manifested in the same unit, but are actually, in the preferred embodiment of the invention, separate controllers. The VSC 46 communicates with the ECU 48, as well as a battery control unit (BCU) 50 and a transaxle management unit (TMU) 52 through a communication network such as a controller area network (CAN) 54. The BCU 50 connects to the battery 36 via a hardwire interface. Further, the HEV 10 includes a speed sensor 27 which senses the speed of the crankshaft 25 and which communicates this information to the ECU 48. Another sensor (not shown) may monitor the temperature of the air that is inducted into the engine 24 and provide this information to the ECU 48.

Figure 2A:
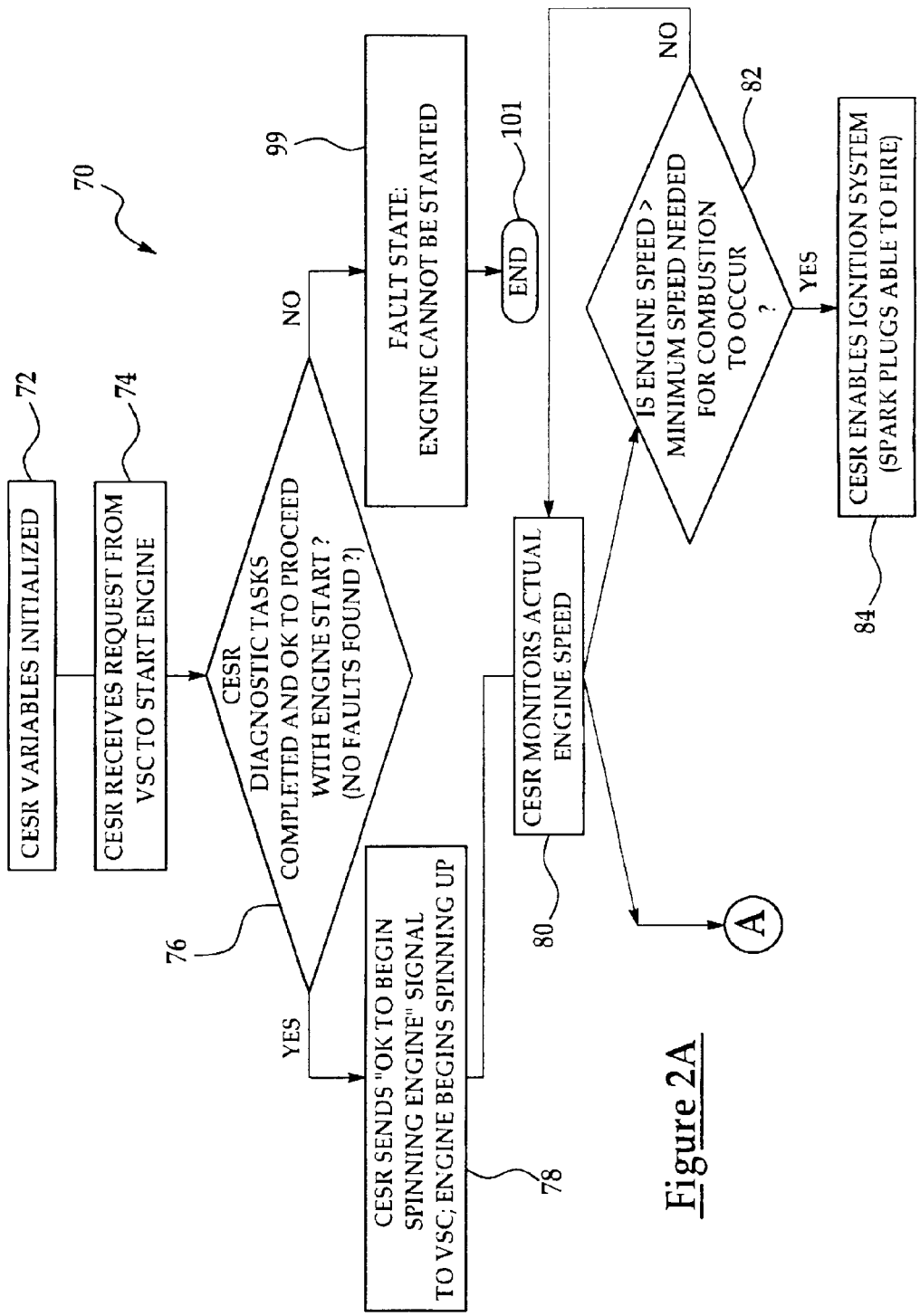
FIG. 2 is a flow chart that illustrates the HEV operation of a hybrid electric vehicle according to the methodology of the preferred embodiment of the invention which may be referred to as a controlled engine startup routine or CESR.
Figure 2B:
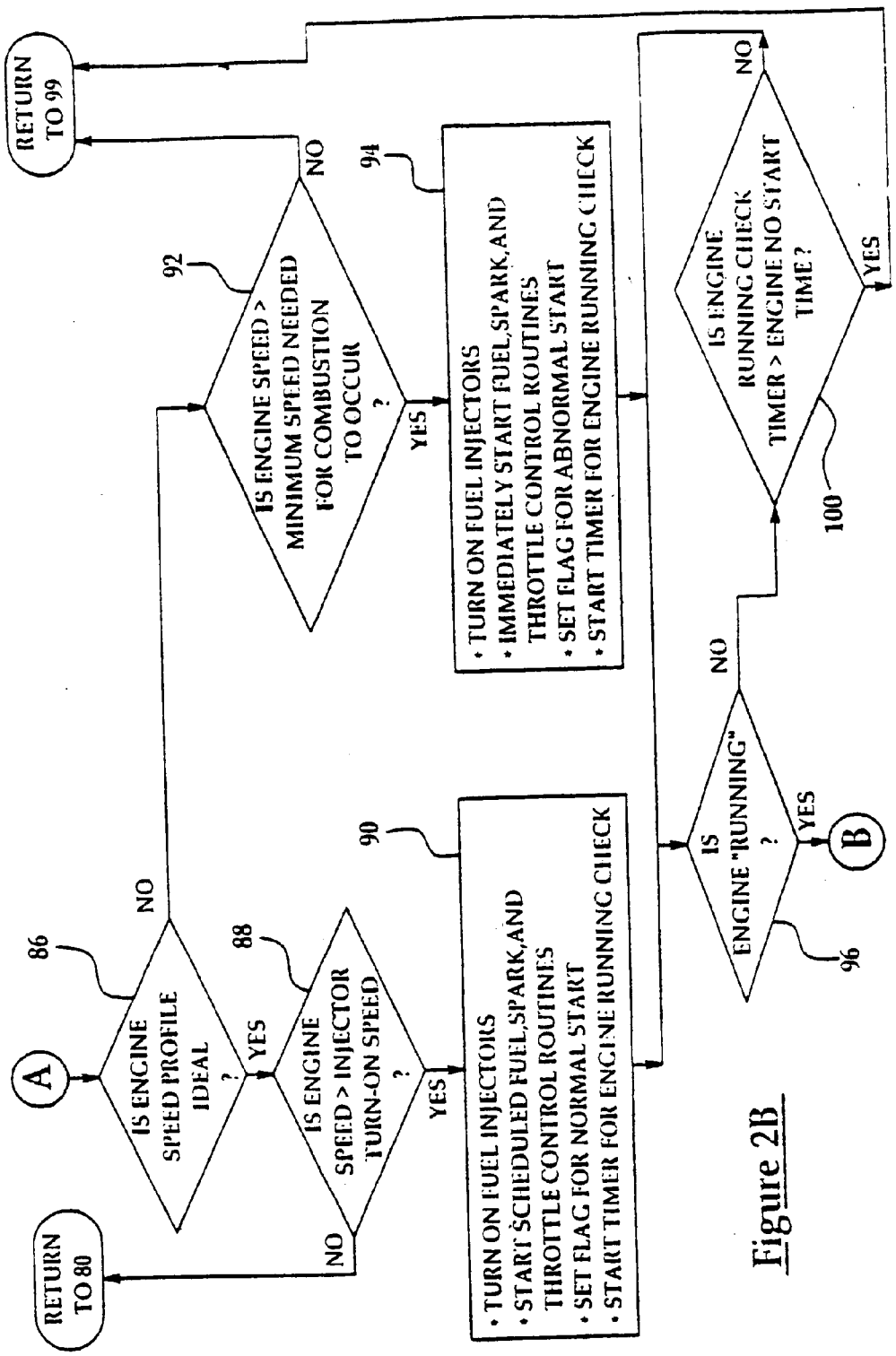
Figure 2C:
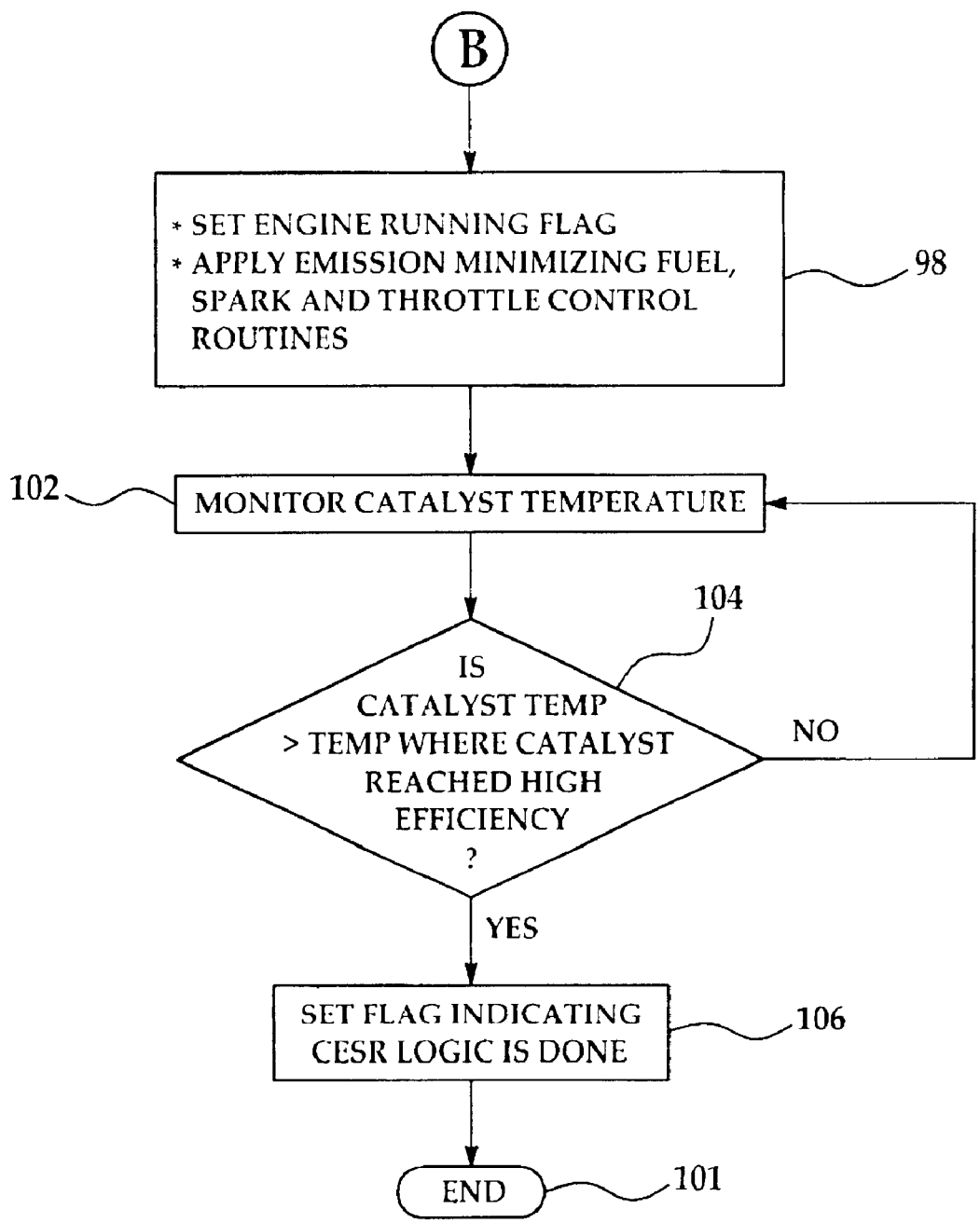

In one non-limiting embodiment of the invention, controllers 46, 48, and 52 may be replaced by a single controller which operates under stored program control and this single controller may perform the operations of the controlled engine startup routine which is shown by way of example and without limitation within FIG. 2. Alternatively, the controlled engine startup routine, which is described in greater detail below, may be cooperatively performed by all or some of the controllers 46, 48, and 52.

Further, at the outset, it should be realized that in order to achieve a relatively smooth activation or start of the internal combustion engine 24 (i.e., a start or activation which minimizes the amount of noise, vibration or "harshness" (NVH) which is generated in the vehicle body or powertrain components and/or communicated to the passengers and/or operator of the vehicle) with a concomitant reduction of undesirable hydrocarbon emissions, and a smooth transfer of torque from the engine 24 to the wheels 42, it is very desirable to allow combustion to occur within the internal combustion engine 24 only after the crankshaft 25 of the engine 24 has been rotated to some predetermined speed. Further, it is also highly desirable in the most preferred embodiment of the invention, that this non-combustion generated rotational target speed be achieved by increasing the speed of the crankshaft 25 in a ramped manner. The term ramped, as used in this description, means a condition in which the speed of the crankshaft 25 (or other portion of the vehicle 10) increases by a substantially identical amount during each substantially identical interval of time during a precombustion or prestart period.

The term speed profile or "starting profile", as used within this Application, means the relationship between the rotational speed of the engine 24 (e.g., the rotational speed of the crankshaft 25) during the precombustion or prestart period (i.e., during a time period which begins when combustion is requested (e.g., the ignition key is activated) and which ends when combustion occurs within the engine 24 or it is determined that the engine 24 cannot be sufficiently spun in order to allow combustion to occur). For example, as is shown in graph 90 of FIG. 3, this time period is defined by a first time or point 93 (or just prior to this point 93) at which the engine 24 is initially ordered or commanded to commence rotating (i.e., when the ignition is turned), and a second time 105 at which the target speed 95 or the maximum attainable non-combustion speed 95 is achieved. Thus, in the most preferred starting methodology of the invention, the internal combustion engine 24 is activated or started according to the ramped profile 114. Other less desirable starting profiles, such as shown by profiles 110, 112 may occur if the generator 30 or the battery 36 cannot provide the torque necessary to spin or rotate the crankshaft 25 of the engine 24 to the target speed 95. Moreover, as is discussed in greater detail below, if the desired starting profile 114 is achieved and the appropriate engine 24 speed is reached, then appropriate control of the fuel injectors 13 (e.g., control of the amount of delivered fuel, and control of the activation sequencing of the injectors 13), throttle plate 11, and spark plug 15 firing sequencing further allows hydrocarbon emissions to be reduced and a smooth transfer or communication of torque to the powertrain to occur. The combination of the use of desired starting engine speed profile 114 together with the previously described control and sequencing of the engine actuators (fuel injectors 13, throttle plate 11, and spark plugs 15) provides optimal benefit. However, the use of the ramped starting profile 114 alone provides substantial reductions in NVH, hydrocarbon emissions, and increased torque transfer efficiency to the wheels 42. Hence, the "ramped profile" may advantageously be used separate and apart from the control and sequencing of the injectors 13, throttle plate 11, and spark plugs 15 which is more fully described below. These profiles 110, 112, and 114 are also more fully described below.

Figure 3:
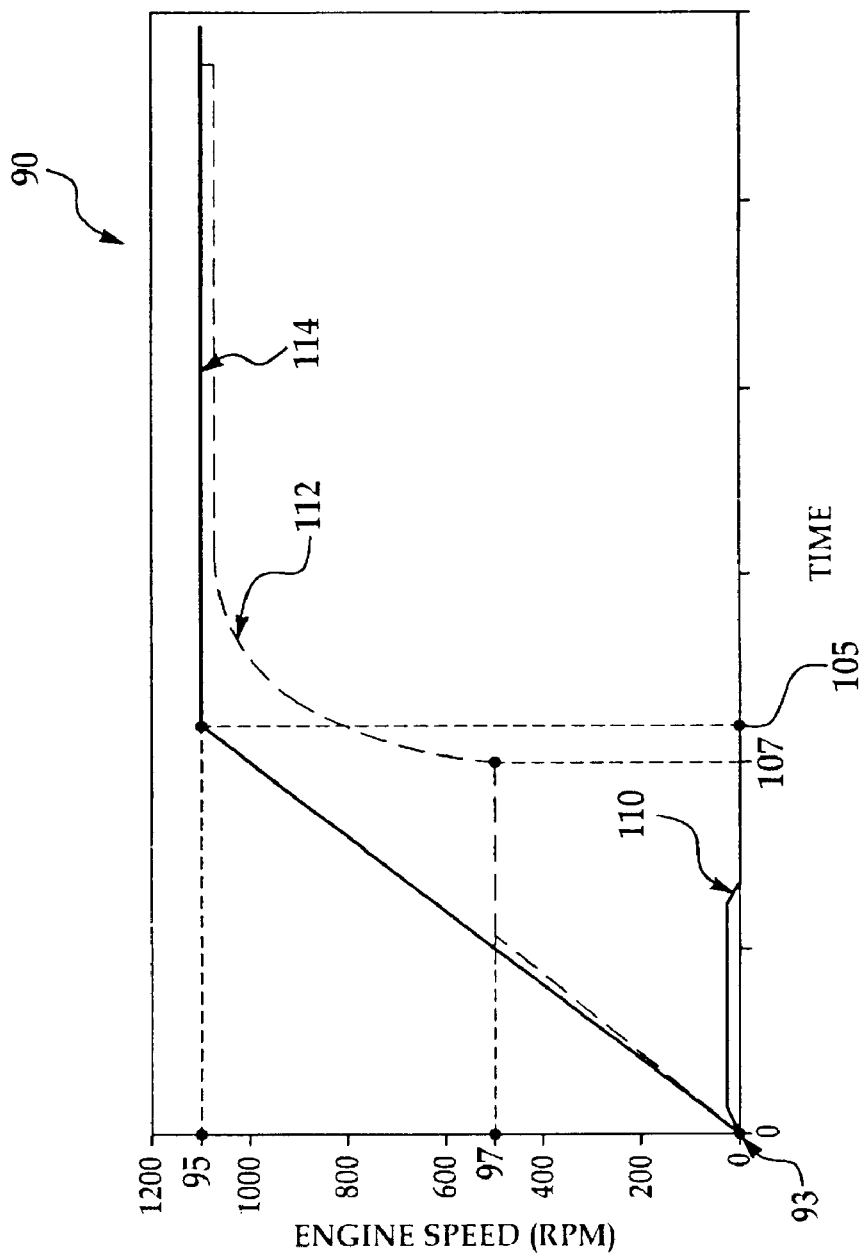
FIG. 3 is a graph that illustrates the desired "start profile" of the methodology of the preferred embodiment of the invention, in addition to various other undesirable "start profiles".

As shown best in graph 90 of FIG. 3, each of the starting profile curves 110, 112, and 114 begin at a time or just before a time 93 at which the engine 24 is initially ordered or commanded to commence rotating. Curve 114 represents the "ideal profile" where the generator 30 spins the engine 24 to the target speed 95 (e.g., such as a speed greater than or equal to about 1000 revolutions per minute) during the pre-start time period which begins at point 93 and ends at point 105 and before the engine 24 (e.g., the injectors 13) is/are activated to begin creating combustion torque. The duration of the pre-start time period may vary depending upon the type of vehicle that the methodology of the preferred embodiment of the invention is used within. For example, this time period may be less than about thirty seconds, although other periods may be utilized or realized.

Curve 112 represents a starting profile in which the electrical components (e.g., the generator 30 and/or battery 36) are not able to spin the engine 24 to the target speed 95, but only allow the engine 24 (i.e., the crankshaft 25) to achieve a minimal speed required to allow combustion to occur. In this case, the controlled engine startup routine will detect this undesired profile, enable or selectively activate the injectors 13 and spark plugs 15, and thereby assist the engine 24 to increase its speed and to create combustion torque in a partially ramped manner (e.g., profile 112 is of a ramped form until the speed 97 is obtained). As shown in FIG. 3, this activation point 107 occurs much earlier than the ideal activation point 105 (i.e., where the desired engine speed is achieved) in the pre-start period.

Curve 110 represents a starting profile in which the electrical components (generator 30 and/or battery 36) are not only unable to spin the engine 24 to the target speed, but are also unable to spin the engine 24 (i.e., the crankshaft 25) to the minimum speed required for combustion to occur. In this case, the engine 24 cannot be started at all, and therefore the injectors 13 and spark plugs 15 are not activated.

These profiles 110, 112, 114 are more fully explained below with reference to the operational methodology of the preferred embodiment of the invention. However, at the outset, it should be noted here that future reference in the description of this methodology to the turning on or enabling of the fuel injectors 13 is intended to imply that the enablement of injector 13 may be accomplished by having one or more of the injectors 13 be concomitantly activated, or by activating all of the fuel injectors 13 at substantially the same time. In addition, future reference in this description to the control of the position of throttle plate 11 is intended to imply the use of an electronic throttle control (ETC) system, the control for which reside in the ECU 48. That is, when reference is made to the positioning of the throttle plate 11 during an activation of the engine 24, it should be realized that this may be accomplished in one of two ways. One way is by scheduling an absolute throttle position by the use of calibration scalars, functions, or lookup tables in a known manner. The other way is by scheduling a desired engine torque if a torque based engine control scheme is being implemented in the ECU 48. In this scheme, a desired torque of the engine 24 may be uniquely associated with a desired engine airflow which may then be comprised or broken down into a desired position of throttle plate 11 required to achieve that engine torque and airflow. Such throttle position strategies are described within U.S. Pat. No. 6,186,124 B1 ("the '124 patent") which is fully and completely incorporated herein by reference, word for word and paragraph for paragraph.

Referring now to FIG. 2, there is shown a methodology or flow chart 70 that represents the hybrid electric vehicle Controlled Engine Startup Routine (CESR) of the most preferred embodiment of the invention. In this preferred embodiment, the CESR 70 is manifested within software which is resident within the ECU 48. However, it should be appreciated that the CESR may be manifested in firmware or a mixture of hardware and software and may wholly or partially reside within other controllers.

Particularly, CESR 70 begins with an initial step 72 in which the ECU 48 initializes all of the variables used in the CESR 70 to respective initial values that allow these variables to be used to perform the methodology set forth below.

In step 74, which follows step 72, the ECU 48 (e.g., the CESR software residing within the ECU 48) receives a request from the VSC 46 to start the engine 24. The VSC 46 determines the need to start the engine 24 based on driver input signals or conditions, such as the position of the ignition key, the accelerator pedal position, and vehicle speed. In the most preferred embodiment of the invention and regardless of the reason or the need to start or activate the engine 24, in this methodology 70, the VSC 46 is not allowed to command the TMU 52 (and thus the generator 30) to begin spinning the engine 24 (i.e., to begin spinning the crankshaft 25) until the ECU 48 performs some self-checks or diagnostics and then returns an acknowledgment signal back to the VSC 46 that indicates that the VSC 46 may proceed to spin the engine 24 (i.e., to spin the crankshaft 25).

In step 76, the CESR 70 performs some self-checks or diagnostics to ensure that the software is ready to execute the engine starting process. This includes, but is not limited to, such tasks as alerting other engine control software routines to be prepared to start the engine 24 (e.g., alerting the injector enabling routine, spark timing control routine, fuel delivery control routine, and the throttle plate control routine). It should be noted that these routines may reside or be performed within the CESR 70 or outside of the CESR software or logic 70, but within the ECU 48. These diagnostics also include determining whether any hardware fault exists within the engine 24.

If step 76 is not successful, the CESR process 70 proceeds to step 99 which comprises a fault state indicative of the fact that the engine 24 is not capable of being started. A fault indication signal may also be provided. Step 99 is followed by step 101 in which the CESR process 70 is ended.

If step 76 is successful, the CESR 70 logic or process proceeds to step 78 where the ECU 48 sends the acknowledgment signal to the VSC 46 that the ECU 48 is now ready to start the engine 24 once the appropriate target speed of engine 24 has been achieved. Further, the VSC 46 commands the TMU 52 to spin the generator 30 (and thus the engine 24, since they are mechanically coupled by the use of the planetary gearset 20) to a target engine 24 speed in a controlled and ramped manner.

Step 80 follows step 78 and, in this step 80, the CESR process 70 monitors the actual speed of the engine 24 (i.e., the speed of the crankshaft 25) resulting from the spinning of the generator 30 (e.g., by use of speed sensor 27). Steps 82 and 86 both follow step 80 in which two different checks measurements of the engine speed are made.

The first check, in step 82, determines whether the engine speed has at least reached the minimum engine speed that is required to sustain "legitimate" engine combustion. This minimum engine speed that defines the point of "legitimate" combustion may comprise a calibratable threshold that is a function of, but is not limited to, the temperature of the engine 24 or the temperature of the air being introduced into the engine 24. If this speed is achieved, then the engine 24 is considered to be activatable and the ignition system is enabled in step 84, thereby allowing the spark plugs 15 to fire according to a spark timing control routine. Step 82 is continuously performed by the process 70 in order to determine if the engine speed is high enough to fire or activate the spark plugs 15 until the CESR 70 logic is stopped.

The other check or determination of engine speed occurs in step 86, which is concurrently executed with step 82. Particularly, the CESR logic or software 70, in this step 86, determines if the speed profile of engine 24 is "ideal". This check or determination is used in fixing or setting the time that the fuel injectors 13 will be turned on or activated in order to allow combustion to occur within the engine 24. Specifically, the CESR process 70 monitors the speed profile of the engine 24 and compares it to a predetermined and ideal speed profile, such as profile 114 shown by graph 90 of FIG. 3, in order to determine whether the ideal profile 114 is being accomplished.

The method of monitoring the speed profile of engine 24 may be accomplished in many ways in the CESR logic 70. One way is to calculate the rate of change of the engine speed (i.e., the speed of the crankshaft 25) over one or more predetermined intervals of time and then comparing these measurements to a calibratable rate of change associated with an ideal engine speed profile 114 (e.g., by respectively comparing these rate of changes to the slope of curve 114). If the monitored engine speed rate of change is less than the calibratable ideal rate of change, during an interval of time, the CESR logic 70 ascertains that the ramped profile 114 has not and cannot occur due to some form of power limitation in the system (e.g., the generator 30 cannot spin the crankshaft 25 to the requisite speed).

Alternatively, the CESR logic 70 may use a predetermined ideal or desired engine speed profile that is characterized by a calibratable function which is variable over time. For example, the profile 114 may be expressed as a mathematical function of speed and time and provides a certain speed value at a certain point in time within the pre-start time interval. The measured speed profile of engine 24, at a certain point within the pre-start interval, is then compared, in real time, to the expected or ideal speed. If the measured speed of engine 24 falls below a calibratable amount from the expected speed characterized by and/or provided by the function, then the CESR logic 70 ascertains that the ramped profile 114 has not and cannot occur due to some form of power limitations in the vehicle 12.

If the profile is found acceptable, within step 86, then step 86 is followed by step 88 in which the CESR 70 determines whether the engine speed is greater than a calibratable threshold necessary to turn on or activate the fuel injectors 13. This calibratable threshold may be a function of engine temperature, battery current, battery voltage, or battery temperature. The threshold may also be either an absolute engine speed or it may comprise a certain speed below the desired target engine speed that is being commanded by the VSC 46. For example and without limitation, if the target engine speed for a particular engine 24 is about 1000 rpm, then the injectors 13 could be turned on or activated at a speed which differs from the target speed by about 100 rpm (e.g., a speed of about 900 rpm). This calibratable threshold of engine speed is used for ideal engine speed profiles only within the CESR 70 logic.

When this engine speed threshold is reached, the CESR logic 70 moves from step 88 to step 90 where the fuel injector enabling routine, the fuel delivery control routine, the spark timing control routine, and the throttle plate control routines are enabled in order to deliver the proper (calibratable) fuel amount, spark timing, and throttle plate position. At the same time, a flag is set indicating that a normal engine start event has occurred (i.e., the engine starting process has desirably followed an ideal profile). In addition, unique calibration variables (e.g., scalar, functions, and/or lookup tables) may be used to schedule the fuel amount, spark timing, and throttle plate position for the purpose of starting the engine combustion process while substantially minimizing exhaust emissions. For example, as described within U.S. Pat. No. Re. 36,737 ("the '737 patent") which is fully and completely incorporated herein by reference, word for word and paragraph for paragraph, combustion occurs in the first engine cycle by injecting a quantity of fuel in the combustion chambers which results in an air/fuel ratio being substantially identical to a stoichiometric ratio. In order to achieve a stoichiometric air/fuel ratio, the amount of fuel actually injected into the combustion chambers is greater than the amount required to a achieve a stoichiometric air/fuel ratio in the gases, in order to account for combustion chamber wetting effects, which are more pronounced when the surface of the combustion chambers are cold, thus preventing effective vaporization of the fuel which impacts the surface of the combustion chambers. Spark timing in the first engine cycle may be preferably empirically determined to provide the greatest probability for combustion of the air/fuel mixture and the spark timing may be approximately ten degrees before Top Dead Center (TDC) in the compression stroke in order to achieve desired combustion. Other strategies may be employed.

Step 86 is followed by step 92 if the engine 24 has not reached the required speed at which to turn on the injectors 13. That is, either the speed profile will be deemed acceptable and the engine speed will reach the threshold at which to turn on the injectors 13, or the starting speed profile of engine 24 will be detected as abnormal and the CESR logic 70 will utilize an alternative technique or approach to activate the fuel injectors 13, and then move to step 92. Hence, step 92 occurs only if the ideal engine speed profile 114, during the spin up process, was not met and an abnormal engine start up process is required to be activated. Step 92 therefore comprises the first step in this alternative process for starting the engine 24 in this abnormal or undesired manner.

In step 92, the engine speed is once again compared to the minimum engine speed 97 that is required to sustain "legitimate" engine combustion. If, in step 92, the measured engine speed is below the calibratable threshold speed 97 that defines the minimum engine speed required for engine combustion, then the engine 24 is considered to be not activatable and the CESR logic 70 proceeds to step 99.

If, in step 92, the measured engine speed is greater than the calibratable threshold 97 that defines the minimum speed required for engine combustion, then the CESR logic or process 70 proceeds to step 94 where the fuel injector enabling routine, the fuel delivery control routine, the spark timing control routine, and the throttle plate control routines are enabled in a substantially immediate manner (as opposed to only once a specified engine speed threshold is met in the case of the normal start). This immediate enablement allows combustion to occur within the engine 24 in order to assist the engine 24 in attaining the target speed specified by the VSC 46. As in step 90, unique calibration variables (whether scalar, functions, or lookup tables) may be used for scheduling the fuel amount, spark timing, and throttle plate position for the purpose of starting or activating the engine combustion process while substantially minimizing exhaust emissions. In addition, step 94 includes the task of setting a flag indicating that an abnormal engine 24 starting event has occurred (i.e., the engine starting process did not follow the ideal speed profile 114).

At the conclusion of each of the steps 90, 94, the fuel injectors 13 have been turned on and the appropriate amount of fuel, spark timing, and throttle plate position has been scheduled to begin or initiate engine combustion. The next task, in step 96, is to determine whether the engine is running or activated (i.e., creating combustion torque).

If, in step 96, the engine 24 is running (e.g., combustion is occurring within the engine), then the CESR logic 70 process moves to step 98 where a flag is set indicating that the engine 24 is running and the fuel amount, spark timing, and throttle plate position are then scheduled using a different set of calibratable scalars, functions, or lookup tables, with the purpose of minimizing exhaust emissions by rapidly or quickly heating the catalytic converter 7 to the temperature where it is relatively and highly efficient in converting the exhaust emissions from the engine 24. Such strategies are described within the '737 patent and include, by way of example and without limitation, varying the proportion of fuel injected in the intake stroke and the expansion stroke to achieve an increase in the temperature of the catalytic converter 7. For example, the amount of fuel injected during the intake stroke may be reduced to approximately 80% of the total amount to be injected and the amount of fuel injected during the power stroke may be increased to approximately 20% of the amount to be injected in order to increase the temperature of the exhaust gas components and to rapidly heat the catalytic converter 7. These calibratable scalars, functions, or lookup tables therefore serve the purpose of maintaining engine combustion as opposed to the previous set of unique scalars, functions, and lookup tables which are used, within step 90, to start the engine combustion process, or are used to force the engine 24 to run. In addition, a timer is started in step 90, step 94, and/or step 96 that monitor the length of time that the test for engine running has been in progress and is used as a comparison with the engine no start time variable value in order to determine whether further time should be spent in determining whether the engine has been activated.

If, in step 96, it is determined that the engine 24 is not running, then the CESR logic 70 process proceeds to step 100 where the timer is compared to a calibratable threshold that indicates whether too much time has elapsed without the engine 24 running. This threshold violation is typically indicative of the existence of the presence of a fault which is preventing the engine 24 from making combustion torque. If this timer exceeds the calibratable threshold, then the step 100 is followed by step 99. Alternatively, step 100 is followed by step 96.

Once the engine 24 is considered to be running, step 98 is followed by step 102 in which the CESR process 70 monitors the temperature of the catalytic converter 7 (e.g., by measurement or by inference) in order to determine when the catalytic converter 7 has reached a temperature (which is calibratable) indicating that the catalyst is at a high level of efficiency. In one non-limiting embodiment of the invention, the catalytic converter temperature is inferred by the process which is set forth within U.S. Pat. No. 5,540,202 and U.S. Pat. No. 5,492,094, each of which are fully and completely incorporated herein by reference, word for word and paragraph for paragraph.

Step 104 follows step 102 in which the CESR process 70 compares the temperature of the catalytic converter 7 to a calibratable threshold which is indicative of a high level of efficiency. If the temperature of the catalytic converter 7 is greater than this threshold, then the CESR process 70 moves to step 106 where a flag is set indicating that the CESR process 70 is done. If the temperature of the catalytic converter 7 is less than this threshold, then the CESR process 70 returns to step 102 to continue monitoring the temperature of the catalytic converter 7 until the temperature exceeds the calibratable threshold. In this manner, hydrocarbon emissions are further reduced and a smoother operation is achieved with a concomitant efficient torque transfer to the wheels 42. Further, in step 106 a flag or variable may be set and provided which signifies that a desired engine profile has been achieved and the HEV 10 has been activated in a desired manner.

The above description and embodiment(s) of the invention are provided purely for purposes of example. Many other variations, modifications, and applications of the invention may be made without departing from the spirit and/or the scope of the inventions as are more fully delineated within the following claims.

What is claimed is:

1. A hybrid electric vehicle, comprising:

an engine;

a motor;

a disconnect clutch disposed between the engine and the motor for selectively connecting the engine to, and disconnecting the engine from, the motor; and a controller configured to command the motor to rotate the engine, thereby increasing engine speed over time and generating an engine speed profile, the controller being further configured to determine whether the engine speed profile matches a predetermined ideal speed profile, provide fuel to the engine when the engine speed reaches a target speed and the engine speed profile matches the predetermined ideal speed profile, and provide fuel to the engine before the engine speed reaches the target speed when the engine speed profile does not match the predetermined ideal speed profile.

2. The hybrid electric vehicle of claim 1, wherein the controller is further configured to determine whether the engine speed has reached a predetermined minimum speed, and to provide fuel to the engine only when the engine speed is greater than the predetermined minimum speed, the predetermined minimum speed being the engine speed necessary to sustain engine combustion.

3. The vehicle of claim 1, wherein the ideal speed profile is characterized by a line having a constant, positive slope.

4. The vehicle of claim 1, wherein the controller is further configured to determine whether the engine speed has reached a predetermined minimum speed, and to provide fuel to the engine only when the engine speed is greater than the predetermined minimum speed, the predetermined minimum speed being the engine speed necessary to sustain engine combustion.

5. The vehicle of claim 1, wherein the controller is further configured to calculate a rate of change of the engine speed over a predetermined time interval and to compare the calculated rate of change to a rate of change for the ideal speed profile, thereby determining whether the engine speed profile matches the ideal speed profile.

6. The vehicle of claim 1, wherein the ideal speed profile is a predetermined function of time, and wherein the controller is further configured to compare a point on the engine speed profile to an expected speed, the expected speed being determined from the ideal speed profile.

7. The vehicle of claim 1, wherein the controller comprises:

an engine control unit for controlling the engine, and connected to the engine through a hardwire interface;

a transaxle management unit for controlling the motor, and connected to the motor through a hardwire interface; and a vehicle system controller in communication with the engine control unit and the transaxle management unit.

8. The vehicle of claim 7, further comprising a catalytic converter, and wherein the engine includes spark plugs, fuel injectors, and a throttle plate, and wherein the engine control unit is configured with an emission minimizing control routine for facilitating a reduction in exhaust emissions by rapidly heating the catalytic converter, the emission minimizing control routine including controlling spark timing, throttle plate position, and an amount of fuel provided to the engine.

* * * * *